United States Patent [19]

Gould

[11] Patent Number: 4,835,835

[45] Date of Patent: Jun. 6, 1989

[54] METHOD AND APPARATUS FOR MAKING EXTRUDED SEPARABLE FASTENER WITH REACTIVATABLE ADHESIVE

[75] Inventor: Russell J. Gould, Mt. Prospect, Ill.

[73] Assignee: Minigrip, Inc., Orangeburg, N.Y.

[21] Appl. No.: 137,732

[22] Filed: Dec. 24, 1987

Related U.S. Application Data

[62] Division of Ser. No. 894,669, Aug. 8, 1986, Pat. No. 4,731,911.

[51] Int. Cl.⁴ .................. B23P 17/00; B29B 00/00
[52] U.S. Cl. ........................... 29/527.2; 156/66; 156/244.11; 156/500
[58] Field of Search .............. 156/66, 60, 243, 244.11, 156/500; 29/527.2; 383/63, 65

[56] References Cited

U.S. PATENT DOCUMENTS

| | | | |
|---|---|---|---|
| 3,338,284 | 8/1967 | Ausnit | 24/587 |
| 3,462,332 | 8/1969 | Goto | 156/244 |
| 3,532,571 | 10/1970 | Ausnit | 156/91 |
| 3,579,730 | 5/1971 | Ausnit | 18/12 |
| 3,773,580 | 11/1973 | Provost | 156/66 |
| 3,784,432 | 1/1974 | Noguchi | 156/244 |
| 3,785,014 | 1/1974 | Canepa | 156/66 X |
| 3,871,947 | 3/1975 | Brekken | 161/116 |
| 3,948,705 | 4/1976 | Ausnit | 156/73.4 |
| 4,100,237 | 7/1978 | Wiley | 264/40.6 |
| 4,101,355 | 7/1978 | Ausnit | 156/66 |
| 4,196,030 | 4/1980 | Ausnit | 156/244.11 X |
| 4,259,133 | 3/1981 | Yagi | 156/244 |
| 4,263,079 | 4/1981 | Sutrina et al. | 156/244.11 |
| 4,279,677 | 7/1981 | Takahashi | 156/160 |
| 4,327,470 | 5/1982 | Lawrence | 156/66 X |
| 4,354,541 | 10/1982 | Tilman | 150/3 |
| 4,379,806 | 4/1983 | Korpman | 156/244.11 X |
| 4,392,897 | 7/1983 | Herrington | 156/66 |
| 4,419,159 | 12/1983 | Herrington | 156/66 |
| 4,561,109 | 12/1985 | Herrington | 24/587 |
| 4,629,524 | 12/1986 | Ausnit | 156/244.11 X |
| 4,655,862 | 4/1987 | Christoff et al. | 156/244.11 X |
| 4,673,383 | 6/1987 | Bentsen | 156/66 X |
| 4,682,366 | 7/1987 | Ausnit et al. | 156/66 X |
| 4,691,372 | 9/1987 | Van Erden | 156/66 X |
| 4,691,373 | 9/1987 | Ausnit | 156/66 X |

FOREIGN PATENT DOCUMENTS

| | | | |
|---|---|---|---|
| 59-122570 | 7/1984 | Japan | 156/243 |
| 1546433 | 5/1979 | United Kingdom . | |
| 1587609 | 4/1981 | United Kingdom . | |
| 2080412 | 2/1982 | United Kingdom | 29/527.2 |
| 2080412A | 2/1982 | United Kingdom . | |

OTHER PUBLICATIONS

"BFGoodrich Plastilock Hot Melt Selector Guide", four pages; 1982.
"Assembly of fabricated parts, Adhesive bonding," Modern Plastics Encyclopedia 1979–1980, pp. 418–420.
"Assembly of fabricated parts, Adhesive bonding," Modern Plastics Encyclopedia 1973–1974, pp. 480–481.

*Primary Examiner*—P. W. Echols
*Assistant Examiner*—Carl J. Arbes
*Attorney, Agent, or Firm*—Hill, Van Santen, Steadman & Simpson

[57] ABSTRACT

A synthetic resin resiliently flexible separable fastener strip adapted for attachment to a substrate, is thermoplastically extruded in continuous strip form and provided with a base surface to which is applied during extrusion an adhesive in fluent state, with the extruded strip and adhesive carried thereby being then concurrently cured so that the fastener as formed and the adhesive in a dormant state on the strip can be rolled into a storage roll. The material of the fastener strip and the material of the adhesive are selected to permit the adhesive on the strip to be reactivated when the strip is to be adhesively bonded to a substrate, without deformably affecting the fastener strip. By extruding the strip without base webs, a plurality such as at least four, separate complementary strips can be extruded from a single die for efficiently joining sets of the profile strips into separable fastener assemblies immediately after concurrent curing of the extruded strips and the reactivatable adhesive.

25 Claims, 2 Drawing Sheets

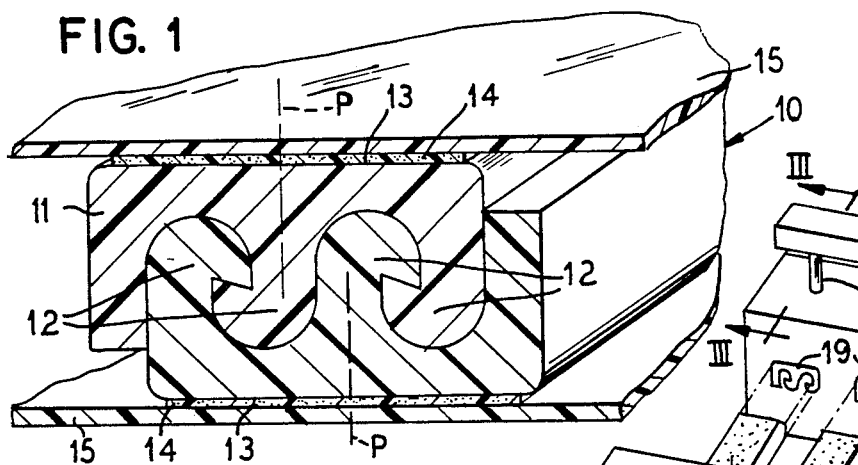
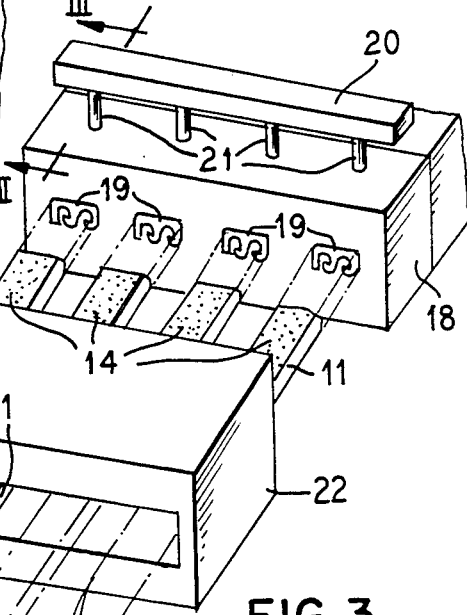
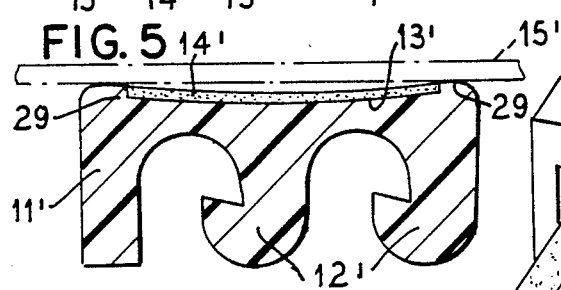
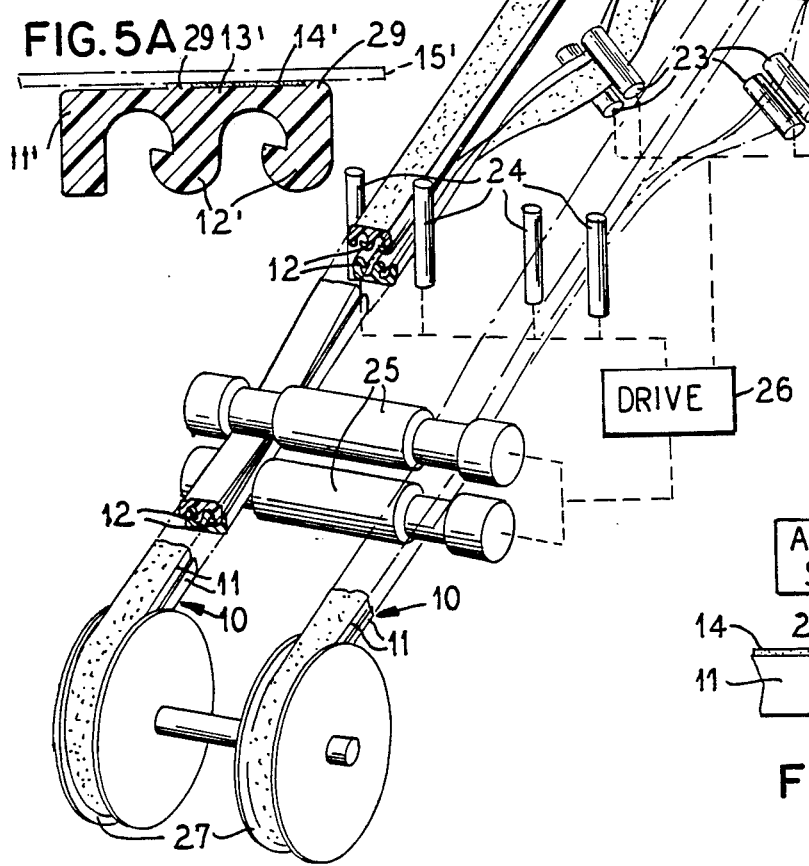
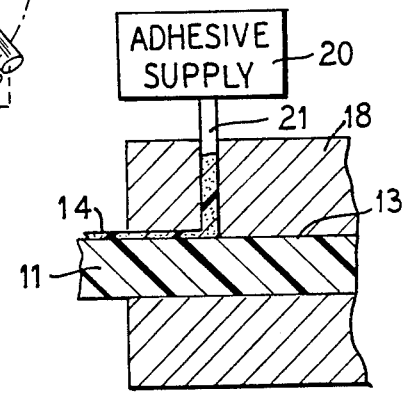
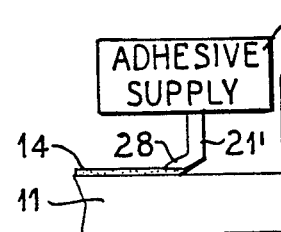
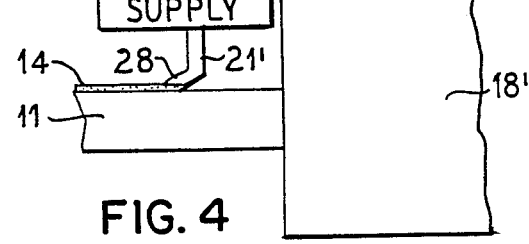

METHOD AND APPARATUS FOR MAKING EXTRUDED SEPARABLE FASTENER WITH REACTIVATABLE ADHESIVE

This is a division, of application Ser. No. 894,669, filed 8/8/86, now Pat. No. 4,731,911 issued Mar. 22, 1988.

BACKGROUND OF THE INVENTION

This invention relates to the art of synthetic plastic resin extruded separable fasteners and a method of making the same, and is more particularly concerned with prefabricating such fasteners at a high rate of production, economically and for subsequent union with desired substrates.

As revealed in the prior art exemplified by U.S. patents, proposals for uniting extruded separable fasteners, sometimes referred to in the trade as zippers, have comprised joining the fastener profile strips to a compatible extruded synthetic plastic film substrate while both of the separately, but simultaneously extruded components are still in a sufficiently plastic state to fuse together, as exemplified in U.S. Pat. Nos. 3,462,332 and 4,259,133.

Another technique, as exemplified in U.S. Pat. Nos. 3,784,432 and 4,279,677, includes joining the freshly extruded profile strips to compatible prefabricated plastic film substrate while the fastener strip is still in a sufficiently thermoplastic state to permit fusing the thermoplastic film which is reheated from a cold state to accelerate the fusion.

A further technique as exemplified in U.S. Pat. No. 3,532,571 includes joining freshly extruded film to compatible prefabricated fastener strips while the film is still in a sufficiently thermoplastic state to permit fusing the fastener strip to the film.

It has, of course, been longtime common practice to join prefabricated fastener strip to prefabricated compatible plastic film by fusion welding, as exemplified in U.S. Pat. No. 3,948,705.

A distinct advantage attributable to prefabricating profile fastener strips and bag making plastic film resides in the fact that because of the relatively larger section modulus of the profile strips as compared to the section modulus of the plastic film, the plastic film when extruded separately can be run at a much greater speeds than the profile fastener strips. Therefore by spooling the prefabricated fastener strips and the prefabricated film is separate rolls, they can be fed simultaneously at desired speed and joined together as by means of adhesive applied in a fluent state between the elements as they are brought convergently together, as exemplified, by U.S. Pat. Nos. 4,101,355; 4,341,575; 4,354,541 and 4,355,494. A distinct advantage of such prefabrication and then adhesive joinder of the profile fastener strips and the substrate is that relatively incompatible materials may be utilized to advantage in the respective elements. For example, a form of plastic material which will lend itself to best advantage for extrusion of the profile strips, and will afford the most advantageous elastic deformation separable coaction of the fastener profiles may be utilized for that purpose, while materials having special characteristics desirable for the end product such as bags may be utilized in the film whether plastic or non-plastic. The composite finished product will then be endowed with all of the preferred characteristic in both the fastener and the substrate.

With all of the advantages inherent in adhesively securing prefabricated elastically deformable separable profile fastener strips to prefabricated film substrate, there is still room for substantial improvement in the adhesive attachment technique. A disadvantage of adhesive attachment as heretofore proposed has been the requirement for extremely accurate control of the fluent adhesive, both as to volume at point of application, temperature gradients during application, tackiness, machine down time, necessarily close attention to the adhesive applicators, avoidance of adhesive spray machine foul-up, and the like. Therefore, onsite adhesive joinder of the profile fastener strips and the substrate has placed a heavy burden on the machine operators to maintain all of the critical parameters necessary for successful results. This has been particularly the case when the adhesive attachment is combined with a form fill operation as described in U.S. Pat. No. 4,355,494, where the advantage of shipping finished film and finished fastener separately and thereby saving space as well as reducing spool change-over because of larger spools, are then lost due to the relatively complex liquid adhesive applying operation.

It has been proposed in published U.K. Patent Application 2,080,412A to provide fastener strips having sidewardly extending attachment webs carrying heat reactivatable adhesive. However, the fastener strips having such attachment webs are more costly to produce than a web-free fastener strip such as disclosed in British Pat. No. 1,587,609. Neither of these British publications has an adequate teaching of how to prefabricate fastener strips with reactivatable adhesive, and in particular such fastener strips without side attachment webs.

SUMMARY OF THE INVENTION

It is accordingly an important object of the present invention to overcome the disadvantages, drawbacks, inefficiencies, limitations, shortcomings, and problems inherent in prior extruded prefabricated resiliently flexible fastener plastic profile strips, and to provide a new and improved fastener of this kind and method and means for making the same.

To this end, the present invention provides a method of prefabricating a synthetic resin elastically deformable, i.e. resiliently flexible, separable fastener profile strip adapted for subsequent attachment to a substrate, and which comprises thermoplastically extruding the strip and providing the extruded strip with a base surface, applying adhesive in a fluent state to the base surface during extrusion of the strip, curing the extruded strip, and concurrently with curing of the strip curing the adhesive on the base surface into a dormant state, so that the strip can be stored until used at a later time by reactivating the adhesive to permit adhesively bonding of the strip to a substrate.

Corresponding apparatus for practicing the method is also provided by this invention.

The invention also provides a synthetic resin resiliently flexible fastener profile strip having a base surface aligned in back of a fastener profile and adapted to be applied to a substrate, and comprising inert adhesive carried by the base surface, and the adhesive being adapted to be reactivated for adhesively bonding the base surface to a substrate.

BRIEF DESCRIPTION OF THE DRAWINGS

Other objects, features and advantages of the present invention will be readily apparent from the following description of certain representative embodiments thereof, taken in conjunction with the accompanying drawing, although variations and modifications may be effected without departing from the spirit and scope of the novel concepts embodied in the disclosure, and in which:

FIG. 1 is an enlarged sectional elevational detail view showing a synthetic resin, resiliently flexible separable fastener comprising an assembly of complementary profile strips and provided with base surface adhesive pursuant to the present invention, by which the fastener is adapted to be secured to substrates;

FIG. 2 is a schematic perspective view demonstrating a preferred method and apparatus for producing fasteners in accordance with the present invention.

FIG. 3 is an enlarged fragmentary sectional detail view taken substantially along the line III—III of FIG. 2;

FIG. 4 is a schematic elevational view showing a modified mode of applying adhesive to the fastener strips;

FIG. 5 is a view similar to FIG. 1, but showing a modification;

FIG. 5A is a view similar to FIG. 5 but showing a modification;

DETAILED DESCRIPTION

Figure 6:
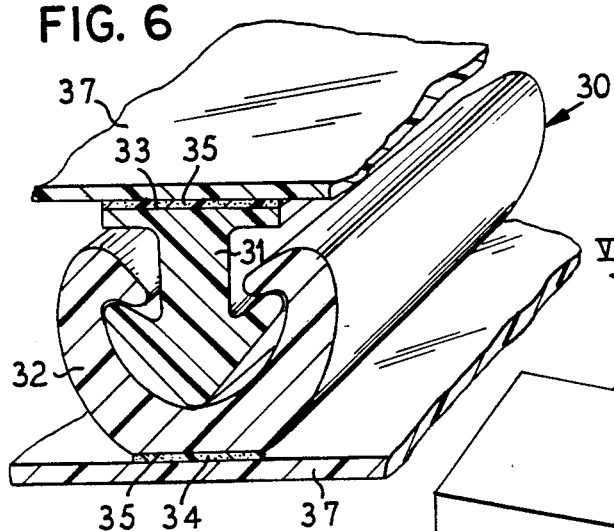
FIG. 6 is a view similar to FIG. 1 but showing another modified form of the resiliently flexible separable fastener pursuant to the present invention.

Referring to FIG. 1, an elastically deformable, resiliently flexible separable fastener 10 comprises preferably identical, extruded plastic strips 11 of the plural interlocking rib and groove type. Each of the fastener strips 11 has a set of profiles 12 extending longitudinally along the strip, and which are of the separably interlocking hooked rib and groove form. By way of example the profiles 12 provide complementary grooves wherein the hooks of the rib profiles of the set on one of the fastener strips interengage within the complementary grooves of the profile set on the companion or mating fastener strip.

Each of the fastener strips has a base surface 13 carrying a dormant but reactivatable adhesive 14 by which the base surface 13 is adapted to be secured to a substrate 15, such as film in the manufacture of reclosable bags, when the adhesive is reactivated, that is converted from a generally non-sticky, dormant freely handleable state into a sticky, adherent operational state. It will be understood that the separable fastener 10, although shown for illustrative purposes in an enlarged form, may be produced in any desirable size suitable for the intended purpose, and in particular for making bag material.

As shown, the fastener strips 11 are advantageously free from lateral flanges, because according to the present invention such flanges are unnecessary. This not only saves plastic material, but also permits a much greater rate of production of the plastic fastener strips 11 carrying the profiles 12, because a greater number of the strips 11 can be simultaneously extruded through an extrusion die. Because of the lack of lateral webs on the profile strips 11, the extrusion orifices can be fairly closely spaced, and a greater multiple of fasteners can be extruded at one time. For example a fastener, or lock, adapted for small bag making, and provided with side webs may require at least six times as much space on the die per lock, as compared to a similar lock without webs. Accordingly, a die can easily accommodate six times as many web-free locks without disturbance in the flow of plastic through the extruder, whereas to attempt to extrude the same number of locks wherein the profile strips have attached webs would be extremely difficult to control. This achieves significant production economy.

Another advantage of webless fastener profile strips is that 10,000' to 15,000' storage and handling spools become readily available, whereas the same size of profile strips with lateral webs must generally be limited to about 6,000' per spool, having regard to a spool size that can be readily handled. Spools with greater footage of fastener profile strip require fewer changes in a production run where the strip is joined to the substrate, and hence less spool change down-time is lost in production.

By way of emphasizing the particular construction and relationship of the elements of each of the closure or fastener strips 11, it may be noted that each base portion and more particularly the base surface 13 of each strip 11 is located in alignment directly back of the profile portion of each strip, the profile portion projecting in the opposite direction from that in which the base surface of the strip faces. The base portions and the profiles are extruded in one piece from a polymeric material and the strip in each instance is shaped cross-sectionally such that a plant P normal to and longitudinally bisecting the base surface 13 also bisects the profile portion into two parts. The dormant but reactivatable adhesive 14 adhering to the base surface 13 may be on both portions of the base surface 13 bisected by the plane P, or may be located on the base surface 13 only along one side of the plane P. The width of the base surface at either side of the plane P may be varied to suit many particular circumstances, especially where the reactivatable adhesive 14 is to be carried by the surface 13 but only on one side of the plane P.

As exemplified in FIG. 2, a compact four orifice extrusion die 18, having two sets of profile strip orifices 19, is thereby adapted to produce simultaneously two complete fastener assemblies 10. Preferred thermoplastic materials from which the profile strips are adapted to be extruded comprise polyethylene having a melting point of from 230° F. to 270° F., polypropylene having a melting point on the order of 345° F., and the like.

According to the present invention, the adhesive 14 is adapted to be applied to the fastener strip base surfaces 13 during extrusion of the strips 11. In one useful mode the adhesive 14 comprises a so-called hot melt adhesive selected from ethylene vinyl acetate, ethylene acrylic acid, polymer rubber resin blend, and the like, having a selected bonding fusion range of from 175° F. to 260° F. The bonding fusion temperature of the adhesive should be sufficiently less than the melting point of the fastener profile strip material to which it is applied to permit the reaching of bonding fusion of the adhesive 14 from a cold generally dormant condition, by application thereto of heat at a temperature which will not cause softening deformation or any other deterioration of the plastic material of the fastener profile strip.

In another useful mode, the adhesive 14 may be of a type which after it has been applied to the fastener strip base 13 is adapted to set to a dry dormant, inactive state from which it can be reactivated by applying a suitable quick acting solvent to its substrate-engageable surface just before the fastener strip joins a substrate to which it is adhesively secured by the reactivated adhesive.

Conveniently, application of the adhesive 14 to the base surfaces 13 of the profile strips 11 is adapted to be effected at the orifices 19, and in a useful mode by coextrusion through the orifices 19 in the die 18, as best visualized in FIGS. 2 and 3. For this purpose, the adhesive 14 in a fluent state is supplied from a supply source 20 for each of the profiles strips 11. From the supply source 20 the fluid adhesive is conducted through a passage 21 in each instance to that area of each of the die orifices 19 which shapes the respective base surface 13 of the profile strip 11. As all of the plurality of profile strips 11 are simultaneously extruded, the adhesive 14 that is applied as a layer to the respective profile strip base surfaces 13 is carried along on the surfaces 13 as the extruded strips emerges from the die 18.

Thence, the strips 11 carrying the adhesive thereon pass to and through means defining a curing zone in this instance comprising a chilling chamber 22 (FIG. 2). There the profile strips 11 are firmed and set, and the adhesive layers 14 are concurrently with the curing of the strips set and cured to a dormant state on the base surfaces 13 but from which dormant state the adhesive can be reactivated later on for bonding to the substrates 15.

In the compact arrangement of FIG. 2, all of the orifices 19 are oriented to form the back surfaces 13 in a common plane, that is facing toward the delivery ports or orifices of the adhesive delivery passages 21. Thus the profiles 12 of the extruded strips 11 all face in the opposite direction. As shown all of the back surfaces 13 of all of the fastener strips 11 face upwardly and all of the profile ribs and grooves 12 face downwardly. By preference the profiled fastener strips 11 are extruded in adjacent pairs so that downstream from the extrusion orifices 19, and after leaving the curing chamber 22, the pairs of complementary strips 11 can be assembled together by relatively reorienting the pairs of fastener strip and interengaging the profiles 12. For example, means may be provided for twisting the corunning profile strips 90° toward one another so that the profiles 12 face each other, and then pushing the strips toward one another to interengage the profiles. On the other hand, one of the profile strips may be twisted 180° relative to the companion profile strip and then the strips joined by pressing the companion strips together for interengaging the profiles 12. For the latter maneuver, strip deflecting and twisting means desirably comprises a series of cooperatively related pairs of rollers comprising a first pair of rotary pinch rolls 23, one of which engages the cured adhesive-carrying back surface 13 of one of the fastener strips 11 and the other of which engages the tips of the profile ribs 12. That initiates not only a twisting of the engaged strip but also deflection of the strip toward the profiles 12 of the companion strip. Thereafter, one or more second pairs of pinch rolls 24, which may engage the sides of the strip 11 being twisted and deflected, complete the turning of the strip into an inverted orientation with the profiles 12 of the inverted strip aligned for interengagement with the profiles 12 of the companion strip which has remained in the orientation in which it was extruded while corunning with the deflected and twistingly reoriented strip. Immediately downstream from this reorientation of the strips 11, the companion strips are pressed together as by means of pinch rolls 25 into closed fastener assembly relation As clearly evident, the pinch rolls 25 are in direct engaging contact with the nonsticky dormant adhesive on the base surfaces of the fastener strips 11. Downstream from the interlocked joining of the fastener strips into closed fastener relation, the continuously running fastener assemblies are adapted to be wound into storage rolls 27 of suitable size for subsequent handling and processing. In the storage rolls 27, it is obvious that the nonsticky dormant adhesive on the base surfaces of the fastener strips is in direct contact with nonsticky dormant adhesive on opposed base surface areas.

Any suitable driving means 26 may drive the pinch rolls 23, 24 and 25 and the spooling means for the storage rolls 27, in properly coordinated relation.

If preferred, the adhesive layers 14 may be applied to the base surfaces 13 of the fastener profile strips 11 during extrusion of the strips, but immediately downstream from the extrusion die 18' (FIG. 4) by applying the adhesive through respective nozzles 28 communicating with adhesive source 20' through passage means 21'. In this arrangement, similarly as in the arrangement where the adhesive 14 and the strips 11 are coextruded, the adhesive and the profile strips are concurrently set into cured condition, and then assembled similarly as has already been described. Application of the adhesive by means of the nozzles 28 is also well suited for applying an adhesive which is reactivatable by means of a solvent where the adhesive when applied is in a fluent state by reason of a solvent vehicle so that the extruded heat of the fastener strips to which it is applied will accelerate driving off the solvent from the adhesive with the curing of the adhesive and the fastener strips then completed concurrently.

Inadvertent, unintended adherence to any surface other than a chosen substrate may sometimes occur by reason of the adhesive 14 possibly having some latent tackiness for any reason after the curing step, or possibly tending to reactivate prematurely when subjected to inadvertent or careless adverse environmental handling or exposure. To avoid such occurence, the arrangement disclosed in connection with FIG. 5 may be employed, wherein the adhesive 14' is applied to the back surface 13' of the fastener strip 11' in each instance within a shallow channel defined on the back surface 13' between transversely spaced spacer and retainer ribs 29 extending longitudinally and integral with the retainer strip 11' and defining the opposite sides of the adhesive receiving channel. The ribs 29 are only slightly, if any, higher than the layer of adhesive 14'.

At least two functions are attributable to the ribs 29. In one function the ribs 29 serve as spacers to maintain out of unintended adhering contact with the adhesive 14' any object at least as wide as the strips 11, such for example as the back of the companion fastener strip in the fastener assembly 10 rolled thereon in a storage spool, or storage or shipping packing material, or guide surfaces with which the strip may have to be in contact in an assembly operation with substrate. To enhance the effectiveness of the spacer ribs 29, the base surface 13' may be formed slightly concave in transverse direction and the layer of adhesive 14' applied to the concave base surface within the channel to a substantially uniformed depth, so that the surface of the set adhesive 14' will also be transversely concave conforming to the channel base surface. Thereby the adhesive 14' will be maintained out of contact with the surface of any object bridging across the spacers 29. However, by reason of the shallow depth of the adhesive containing channel and the shallow height of the ribs 29, only normally moderate relative assembly pressure between the fastener assembly back surfaces and substrate 15' with the adhesive 14' reactivated, will result in thorough adhesion of the fastener strips to the substrate. Where the material of the fastener strips 11' is of sufficient elasticity, pressing against the substrate 15' in the bonding operation will cause uniform deflection of the base surface 13' toward the substrate for bonding by the adhesive 14'. Where the material of the fastener strips 11 is relatively stiff, it may be desirable to yieldably deform the substrate 15', such as a bag making film or the like into the shallow adhesive containing channel provided by the back surface 13' between the spacers 29. Because of the shallow nature of the channel and the spacers 29 deformation of the bonded substrate 15' may be hardly perceptible, and if perceptible unobjectionable for most purposes.

Another function of the spacers 29 is to confine the adhesive 14' against spreading beyond the side edges of the fastener strips 11'. This avoids a possibly unsightly dross condition alongside the bond joint should there by any tendency for the adhesive 14' in reactivated fluidized or tackified condition to spread laterally from the bond joint under pressure during the bonding operation.

Where it is desired to provide the adhesive 14' only along a longitudinal area on a portion of the back or base surface 13', the arrangement shown in FIG. 5A may be utilized wherein one of the shallow rib spacers 29 extends longitudinally along one edge of the base surface 13', while a second one of the spacers 29 extends longitudinally along an intermediate line on the base surface 13'. For example, where it is desired to have the reactivatable dormant adhesive 14' on only one half of the surface 13', the intermediate spacer 29 may extend along a substantially medium longitudinal line on the base surface.

On reference to FIG. 6, an elastically deformable, resiliently flexible separable fastener 30 is of the type comprising a male profile 31 and a female profile 32 which are of the separably interlocking hooked rib and groove form, shown, by way of example, as comprising a generally arrowhead cross-section on the male profile 31 adapted to interhook with a complementary channeled formation of the female profile 32. Each of the profile strips 31 and 32 has opposite its interlocking profile formation a base surface, comprising a base surface 33 on and extending along the male profile 31, and a base surface 34 extending on and along the female profile 32. Each of the fastener base surfaces 33 and 34 carries a reactivatable adhesive 35 by which the respective base surfaces are adapted to be secured to substrate 37 when the adhesive 35 is reactivated, that is converted from a generally non-sticky, dormant, freely handleable state into a sticky, adherent operational state. It will be understood that the fastener 30, although shown for illustrative purposes in an enlarged form, may be produced in any desirable size suitable for the intended purpose, and in particular for making bag material. As will be observed, the fastener profile strips 31 and 32 are advantageously free from lateral flanges, for the advantageous reasons heretofore described.

Figure 7:
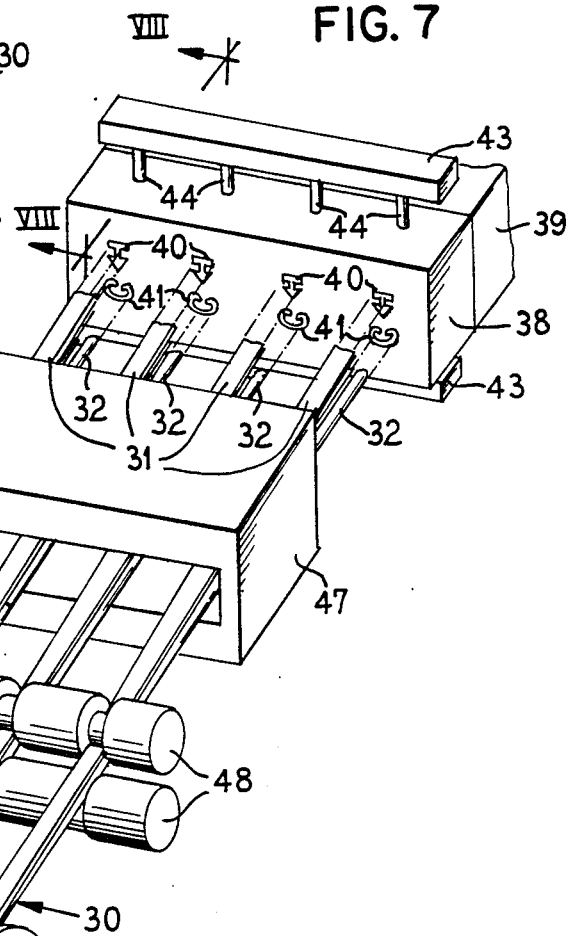
FIG. 7 is a schematic perspective view similar to FIG. 2 but showing a modification in the method and apparatus for producing the fastener of FIG. 6.

As exemplified in FIG. 7, an advantageous fastener strip prefabrication extrusion arrangement is adapted to have a multi-orifice extrusion die 38 adapted for simultaneously extruding profile fastener strip for as many as four fastener assemblies simultaneously. Thermoplastic material is supplied under extrusion pressure to the die 38 by means of an associated extruder 39 which may be of any preferred form adapted for this purpose. Conveniently four companion pairs, comprising a total of eight extrusion orifices will provide for four of the fastener assemblies 30. For this purpose four male profile strip extrusion orifices 40 are located in the die 38 in alignment with four respective female fastener strip forming orifices 41. As shown, the orifices 40 are vertically aligned in superjacent spaced relation to the orifices 41.

Figure 8:
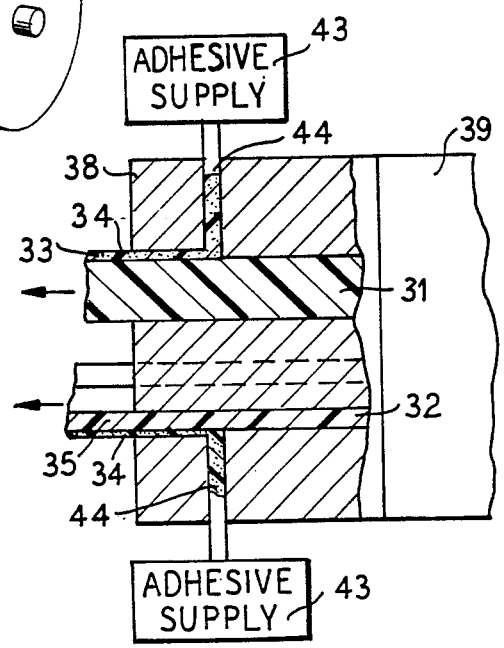
FIG. 8 is an enlarged fragmentary sectional detail view taken substantially along the line VIII—VIII of FIG. 7.

As shown in FIGS. 7 and 8, adhesive 35 is adapted to be applied to the fastener strip base surfaces 33 and 34 by supplying fluent adhesive from a supply source 43 through ducts or passages 44 which deliver the adhesive 35 in the proper volume and width to the respective base surfaces 33 and 34. This coextrusion of the fastener strip plastic and adhesive is especially suitable for heat reactivatable adhesive.

Figure 9:
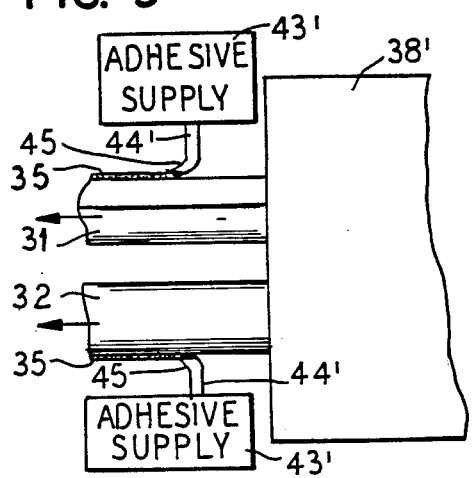
FIG. 9 is a view similar to FIG. 4, but applicable to making the fastener of FIG. 6.

If it is preferred to apply the adhesive layers 35 to the respective base surfaces 33 and 34 of the profile strips 31 and 32, respectively, during extrusion of the strips but immediately downstream from the extrusion die 38' (FIG. 9), the adhesive 35 is adapted to be applied through respective nozzles 45 which communicate with the respective adhesive sources 43' through the passage means 44'. When thus applied, the adhesive 35 may be of either the hot melt type or solvent fluidized type. In either event, the adhesive and profile strips are then concurrently set and cured by running the same through a curing chamber 47 which receives the adhesive equipped corunning fastener strips 31 and 32 adjacently downstream from the extrusion die 38. After the cured fastener strips with the cured adhesive thereon leave the curing chamber 47, the fastener strips in vertical alignment pass between pinch rolls 48 which squeeze the fastener strips toward and into assembly with one another wherein the male and female profiles are separable interconnected. Downstream from the fastener strip assembly pinch rolls 48, the fastener assemblies 30 are wound into storage rolls 49 of suitable size for subsequent handling and processing. It will be understood that the pinch rolls 48 and the usual cores or spools on which the rolls 49 are wound are adapted to be driven in any suitable manner for advancing the extruded profile strips from the extrusion die 38 at a speed compatible with the extrusion speed.

In use, the adhesive-carrying profile strips of the fastener assemblies 10 or 30, as the case may be, are adapted to be joined to the substrates 15 or 37 by reactivating the dormant adhesive 14 or 35 at a proper temperature below the softening point of the plastic material of the associated profile strips, as the adhesive carrying base surfaces are being pressed into adherence with and bonded to the substrate. Where the adhesive carried by the fastener strip bases is of the solvent reactivatable type, the solvent may be applied in any suitable manners such as by means of a suitable applicator, for example an applicator roll immediately upstream from the point at which bonding is effected.

It will be understood that variations and modifications may be effected without departing from the spirit and scope of the novel concepts of this invention.

I claim as my invention:

1. A method of prefabricating a synthetic resin elastically deformable resiliently flexible, separable fastener profile strip adapted for subsequent attachment to a substrate, comprising:

thermoplastically extruding the strip and providing the extruded strip with a base surface;

applying reactivatable adhesive in a fluent state to said base surface during extrusion of the strip and before said strip is cured;

thereafter chill curing the extruded strip;

concurrently with said chill curing of the strip curing said adhesive on said base surface into a nonsticky dormant inactive state; and handling the strip by direct contact with said nonsticky dormant adhesive and thereby preparing the strip to be stored without protective cover over the adhesive, until used at a later time by reactivating said adhesive to permit adhesively bonding of the strip to a substrate.

2. A method according to claim 1, which comprises coextruding said adhesive with said profile strip.

3. A method according to claim 1, comprising applying said adhesive to said base surface of said strip during extrusion of the strip but immediately downstream from an extrusion die and before curing of the strip.

4. A method according to claim 1, which comprises providing said adhesive in a hot melt form having a lower melting point than the material of said strip.

5. A method according to claim 1, which comprises applying said adhesive in a form which is adapted to be tackified from a cold dormant state at a lower temperature than a temperature at which the strip will become deformably soft.

6. A method according to claim 1, which comprises forming a shallow channel in said base surface, and applying said adhesive in said channel in a layer which is no thicker than spacer and retention ribs extending along the opposite sides of said channel.

7. A method of making synthetic resin resiliently flexible complementary separable fastener profile strips adapted for attachment to film substrate, comprising:

simultaneously extruding said strips from respective orifices in a common extrusion die;

applying reactivatable adhesive in fluent state to base surfaces of said strips during extrusion of the strips and before said strips are cured;

thereafter running the adhesive-carrying freshly extruded strips through a curing zone and therein curing said strips and assuring curing of said adhesive into a nonsticky dormant inactive state so that the strips can be handled without requiring protective cover over the adhesive;

joining said strips downstream from the curing zone into a separable fastener assembly;

and then winding the separable fastener assembly into a storage roll for subsequent handling and processing.

8. A method according to claim 7, which comprises coextruding the fastener strips and the adhesive in the extrusion die.

9. A method according to claim 7, comprising applying said adhesive to the base surfaces of the profile strips immediately downstream from the extrusion die.

10. A method according to claim 7, which comprises extruding multiple sets of complementary profile strips which are without any base webs and from closely spaced die orifices in said extrusion die.

11. A method according to claim 10, which comprises extruding at least two sets of complementary fastener strips through two sets of extrusion orifices closely spaced in said extrusion die.

12. A method according to claim 11, comprising extruding said fastener strips with the base surfaces thereof all facing in the same direction, and downstream from said curing zone and before joining of said strips twisting and orienting one of the strips of each of the sets in order to align the profiles of the strips for said joining into separable fastener assembly.

13. A method according to claim 10, which comprises extruding said strips by complementary pairs with profiles of the strips generally aligned for subsequent joining of the strips into separable fastener assembly.

14. A method according to claim 1, wherein said direct handling comprises engaging the nonsticky dormant adhesive by a pinch roll.

15. A method of making a closure strip adapted to be bonded to a substrate such as film in the manufacture of reclosable bags, comprising;

extruding in one piece from a polymeric material a closure strip with a longitudinally extending base portion having a longitudinally extending base surface, and a profile portion extending longitudinally parallel with the base portion and having profile means projecting in the opposite direction from that in which the base surface faces;

shaping said strip cross-sectionally such that a plane projected normal to and bisecting said base surface longitudinally into two parts also bisects the profile portion into corresponding parts;

in said shaping locating said base surface directly back of said profile portion and providing said base surface of a width essentially no wider than said profile portion; and adhering a dormant but reactivatable nonsticky adhesive layer to and along said base surface on at least one side of said plane, so that the closure strip is adapted to be bonded to the substrate upon reactivation of the dormant adhesive.

16. A method of making a closure strip according to claim 15, which comprises forming said strip from a material selected from polyethylene and polypropylene, and providing said adhesive from a material selected from polymer rubber resin blend, ethylene acrylic acid, and ethylene vinyl acetate.

17. A method of making closure strip according to claim 15, comprising forming said base portion surface with spaced longitudinal ribs defining a channel therebetween, and locating said dormant but reactivatable adhesive in said channel.

18. A method of prefabricating a synthetic resin elastically deformable resiliently flexible, separable fastener profile strip adapted for subsequent attachment to a substrate, comprising:

thermoplastically extruding the strip and providing the extruded strip with a base surface;

applying reactivatable adhesive in a fluent state to said base surface during extrusion of the strip and before said strip is cured;

thereafter chill curing the extruded strip;

concurrently with said chill curing of the strip curing said adhesive on said base surface into a nonsticky dormant inactive state; and winding the strip into a storage roll in which the nonsticky dormant adhesive on the base surface is in direct contact with nonsticky dormant adhesive on opposing base surface area.

19. A method of prefabricating a synthetic resin elastically deformable resiliently flexible, separable fastener profile strip adapted for subsequent attachment to a substrate, comprising:

thermoplastically extruding the strip and providing the extruded strip with a base surface;

forming a shallow channel in said base surface;

applying reactivatable adhesive in a fluent state to said base surface in said channel in a layer which is no thicker than spacer and retention ribs extending along the opposite sides of said channel, during extrusion of the strip and before said strip is cured;

thereafter chill curing the extruded strip; and concurrently with said chill curing of the strip curing said adhesive on said base surface into a nonsticky dormant inactive state, so that the strip can be stored without protective cover over the adhesive, until used at a later time by reactivating said adhesive to permit adhesively bonding of the strip to a substrate.

20. Apparatus for prefabricating a synthetic resin elastically deformable resiliently flexible separable fastener profile strip adapted for subsequent attachment to a substrate, and comprising:

die means for thermoplastically extruding the strip and for providing the extruded strip with a base surface;

means for applying adhesive in a fluent state to the base surface during extrusion of the strip and before curing of the strip;

means, downstream from said die means and said adhesive applying means, for curing the extruded strip and concurrently curing said adhesive on said base surface into a nonsticky dormant state so that no cover is needed for the adhesive to permit handling of the strip before its intended use;

and means for placing said strip and adhesive into condition to be stored until used at a later time by reactivating the dormant adhesive to permit adhesively bonding the strip to a substrate, and this means including handling means directly contacting the nonsticky dormant adhesive.

21. Apparatus according to claim 20, wherein said means for applying adhesive is combined with said die means for coextruding said adhesive with said profile strip.

22. Apparatus according to claim 20, wherein said adhesive applying means is located to apply the adhesive to said base surface of the strip during extrusion of the strip but immediately downstream from said extrusion die means and upstream from said curing means.

23. Apparatus according to claim 20, wherein said die means comprises multiple closely spaced sets of complementary profile fastener strip extrusion orifices so located that the complementary profile strips can be readily joined into separable fastener assemblies downstream from said curing means.

24. Apparatus according to claim 20, wherein said handling means comprises a pinch roll.

25. Apparatus for prefabricating a synthetic resin elastically deformable resiliently flexible separable fastener profile strip adapted for subsequent attachment to a substrate, and comprising:

die means for thermoplastically extruding the strip and for providing the extruded strip with a base surface;

means for applying adhesive in a fluent state to the base surface during extrusion of the strip and before curing of the strip;

means, downstream from said die means and said adhesive applying means, for curing the extruded strip and concurrently curing said adhesive on said base surface into a nonsticky dormant state so that no cover is needed for the adhesive to permit handling of the strip before its intended use;

and means for placing said strip and adhesive into condition to be stored until used at a later time by reactivating the dormant adhesive to permit adhesively bonding the strip to a substrate;

said die means comprising multiple closely spaced sets of complementary profile fastener strip extrusion orifices so located that the complementary profile strips can be readily joined into separable fastener assemblies downstream from said curing means.

* * * * *